(12) United States Patent
Anduss

(10) Patent No.: US 7,641,235 B1
(45) Date of Patent: Jan. 5, 2010

(54) VEHICLE HITCH ATTACHABLE TRANSPORTING DOLLY

(76) Inventor: Craig Anduss, P.O. Box 781411, San Antonio, TX (US) 38278

( * ) Notice: Subject to any disclaimer, the term of this patent is extended or adjusted under 35 U.S.C. 154(b) by 334 days.

(21) Appl. No.: 11/780,741

(22) Filed: Jul. 20, 2007

Related U.S. Application Data

(60) Provisional application No. 60/893,403, filed on Mar. 7, 2007.

(51) Int. Cl.
*B60R 11/00* (2006.01)
(52) U.S. Cl. .................. 280/769; 224/519; 224/520; 224/521; 224/509; 224/513; 280/43; 280/47.34; 280/651; 280/79.11; 280/652
(58) Field of Classification Search ............... 224/509, 224/513, 519–521; 280/769, 652, 43, 47.34, 280/651, 79.11
See application file for complete search history.

(56) References Cited

U.S. PATENT DOCUMENTS

| | | | | |
|---|---|---|---|---|
| 4,593,840 | A | * | 6/1986 | Chown ................ 224/520 |
| 4,744,590 | A | * | 5/1988 | Chesney ................ 280/769 |
| 5,018,651 | A | | 5/1991 | Hull et al. |
| 5,060,967 | A | * | 10/1991 | Hulterstrum ............ 280/650 |
| 5,368,209 | A | | 11/1994 | Hill |
| 5,853,189 | A | * | 12/1998 | Swartzlander ............ 280/652 |
| 6,099,035 | A | | 8/2000 | Garvin, III |
| 6,296,262 | B1 | * | 10/2001 | Skinner ................ 280/79.7 |
| 6,502,730 | B2 | * | 1/2003 | Johnson ................ 224/519 |
| 6,846,017 | B2 | | 1/2005 | Martin |
| 6,935,656 | B2 | | 8/2005 | Stout |
| 6,948,732 | B2 | | 9/2005 | Amacker |
| 2004/0173654 | A1 | * | 9/2004 | McAlister ............... 224/519 |
| 2006/0145461 | A1 | * | 7/2006 | Anderson ............... 280/769 |
| 2006/0151555 | A1 | * | 7/2006 | Mills .................. 224/509 |

* cited by examiner

*Primary Examiner*—Lesley Morris
*Assistant Examiner*—Erez Gurari
(74) *Attorney, Agent, or Firm*—Thomas Frost

(57) ABSTRACT

A transporting dolly attachable to a vehicle includes a metal frame having a base with a top surface and a bottom surface mounted on opposed peripheral side brackets, a peripheral front bracket and a peripheral rear bracket. A center support member and outer support members are secured to the bottom surface of the base. The center support member is integrally formed as a hitch connector to engage with a conventional trailer hitch receiver. The top surface of the base provides an area to carry cargo. Swivel jacks are mounted on the frame to allow the frame to be raised and lowered, and additionally provide means to move the dolly with an attached demountable handle.

5 Claims, 7 Drawing Sheets

VEHICLE HITCH ATTACHABLE TRANSPORTING DOLLY

CROSS-REFERENCE TO RELATED APPLICATION

This application claims the benefit of U.S. Provisional Application 60/893,403, filed Mar. 7, 2007.

BACKGROUND OF INVENTION

The present invention relates to a hitch carrier frame adapted to connect to a variety of vehicle hitches having adjustable swivel jacks with rotatable wheels, and a removable handle to transport the carrier frame. The swivel jacks are constructed to fold for storage.

While prior frames have provided wheels for transport, none have the combination of jacks to adjust the elevation of the frames to attach to vehicles where the hitches are at different heights, or to use as a transport wagon means. The frame not only can be used for vehicle cargo transport, but also as a table for camping trips.

SUMMARY OF THE INVENTION

The general purpose of the present invention, which will be described subsequently in greater detail, is to provide a new and improved transporting dolly adapted to connect to vehicle hitches positioned at differing elevations because of the size of the vehicle.

To attain this, the present invention comprises a frame having a base mounted upon peripheral brackets, and having an underside center support member and underside outer support members. The center support member is configured at one end to mate with a frame receiving means mounted on a vehicle.

Adjustable swivel jacks having rotatable wheels are mounted on the frame. At least one handle bracket is also positioned along the perimeter of the frame. A handle is provided to connect with the handle bracket.

It is an object of the present invention to provide a hitch carrier which can be adjusted in elevation through use of swivel jacks with wheels connected to the frame of the carrier. Movement of the carrier is possible through the use of the wheels. Additionally, when the swivel jacks are placed into a locked position perpendicular to the base the jacks can be used to raise the base for use as a table.

It is a further object to provide a detachable handle to facilitate movement.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
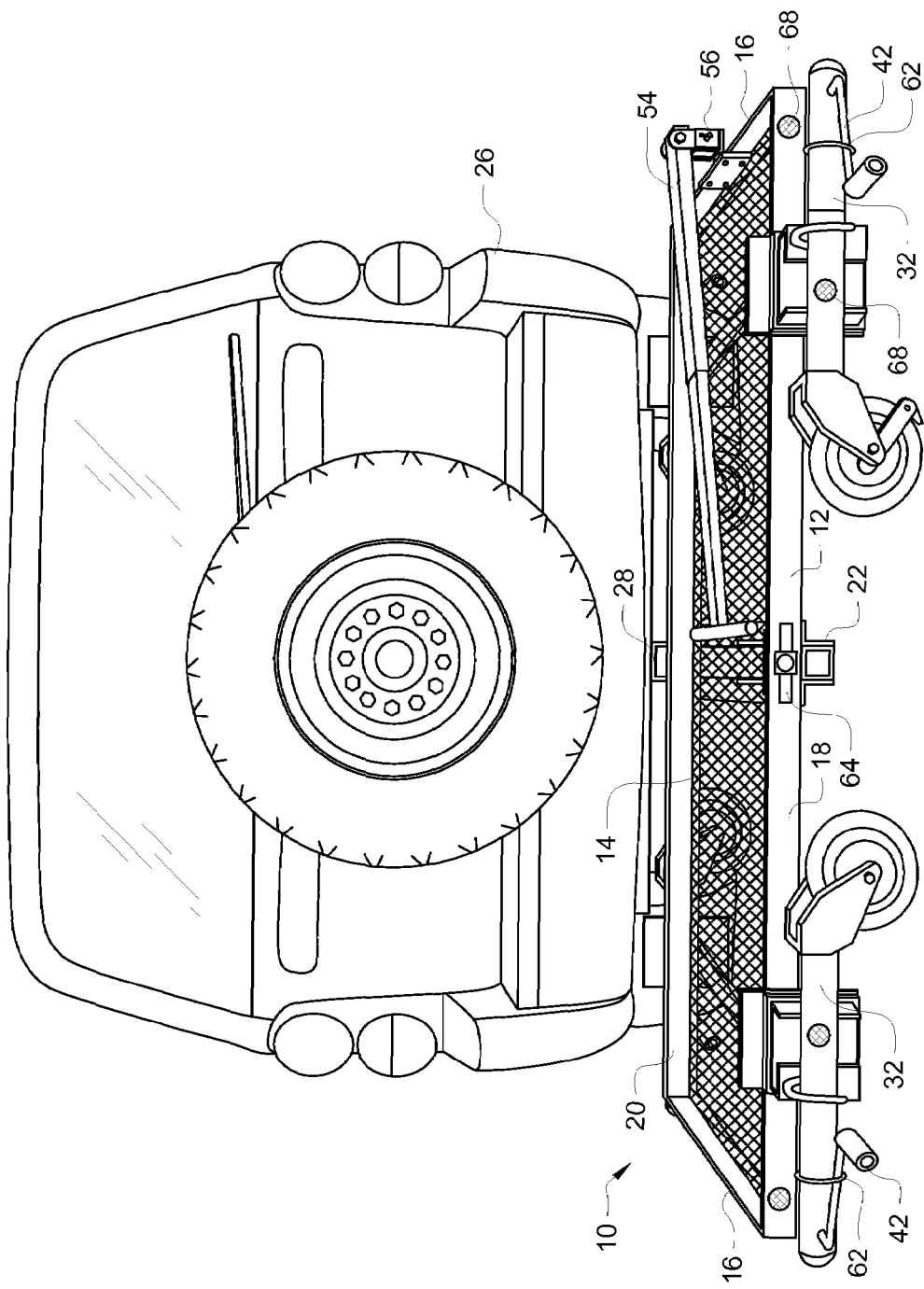
FIG. 1 is a perspective view of the present invention attached to a vehicle.
Figure 2:
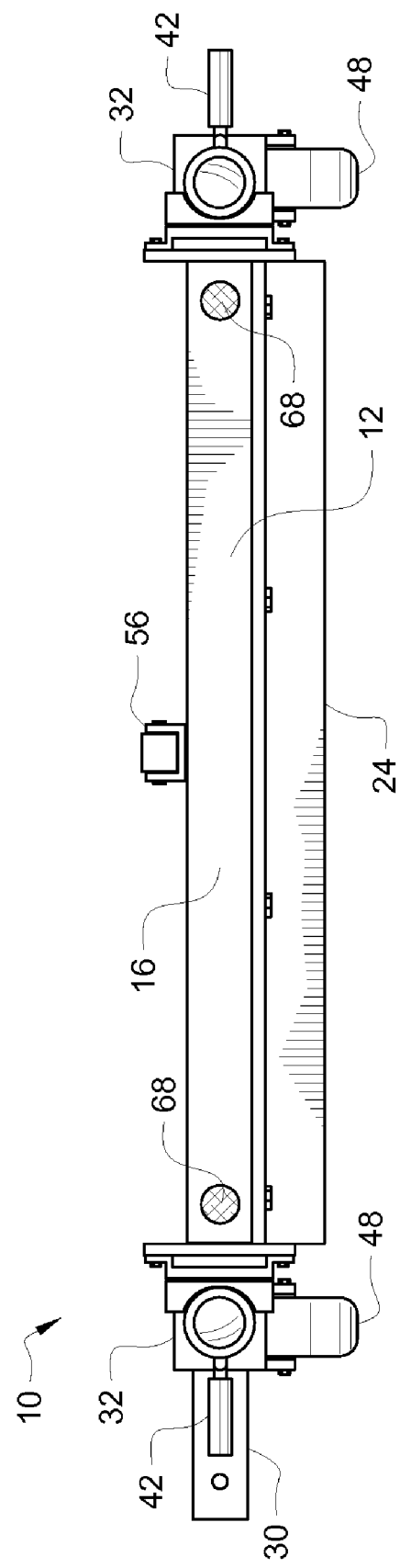
FIG. 2 is a side view of the present invention.
Figure 3:
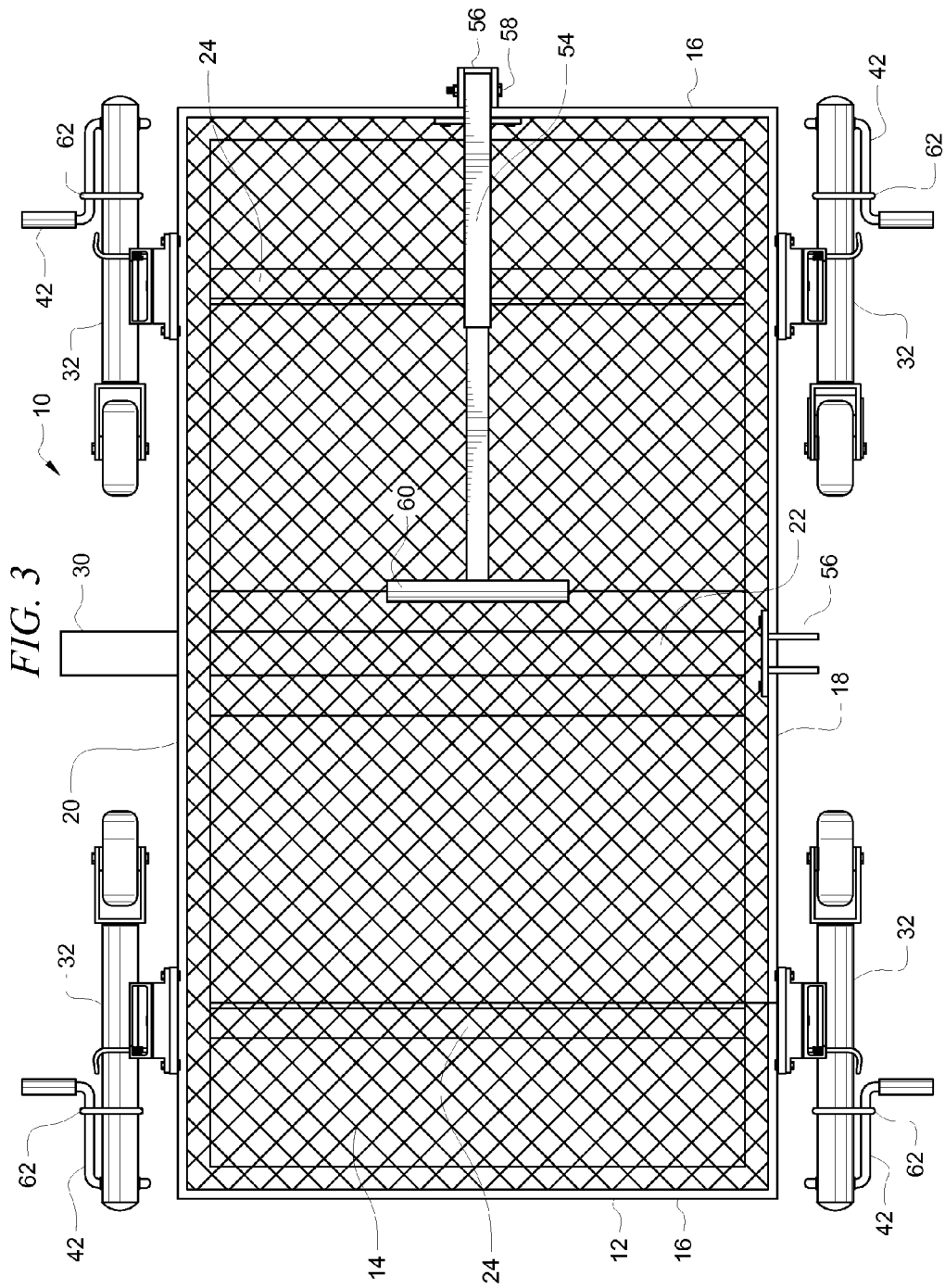
FIG. 3 is a top plan view of the present invention.

In reference first to FIGS. 1 and 3 an improved transporting dolly 10 attached to a vehicle 26 is shown. The dolly 10 is comprised of a metal frame 12 having a base 14 with a top surface and a bottom surface mounted on opposed peripheral side brackets 16, a peripheral front bracket 18 and a peripheral rear bracket 20. The brackets 16, 18, 20 have a floor section and a side wall section which are integrally formed at a ninety degree angle. A center support member 22 and outer support members 24 are secured to the bottom surface of the base 14. The center support member 22 has a first end and a second end, the second end integrally formed as a hitch connector 30. The base 14 is preferably grated and the top surface of the base 14 provides an area to carry cargo.

The hitch connector is adapted to mate with a trailer hitch receiver 28 mounted on the vehicle 26. This receiver type is well known to those skilled in the art, and further detailed discussion of the same is not deemed necessary. A quick release pin preferably holds the connector 30 and receiver 28 together, although other fastening means are possible. By pulling the pin the connector 30 can be disengaged from the receiver 28.

Figure 4:
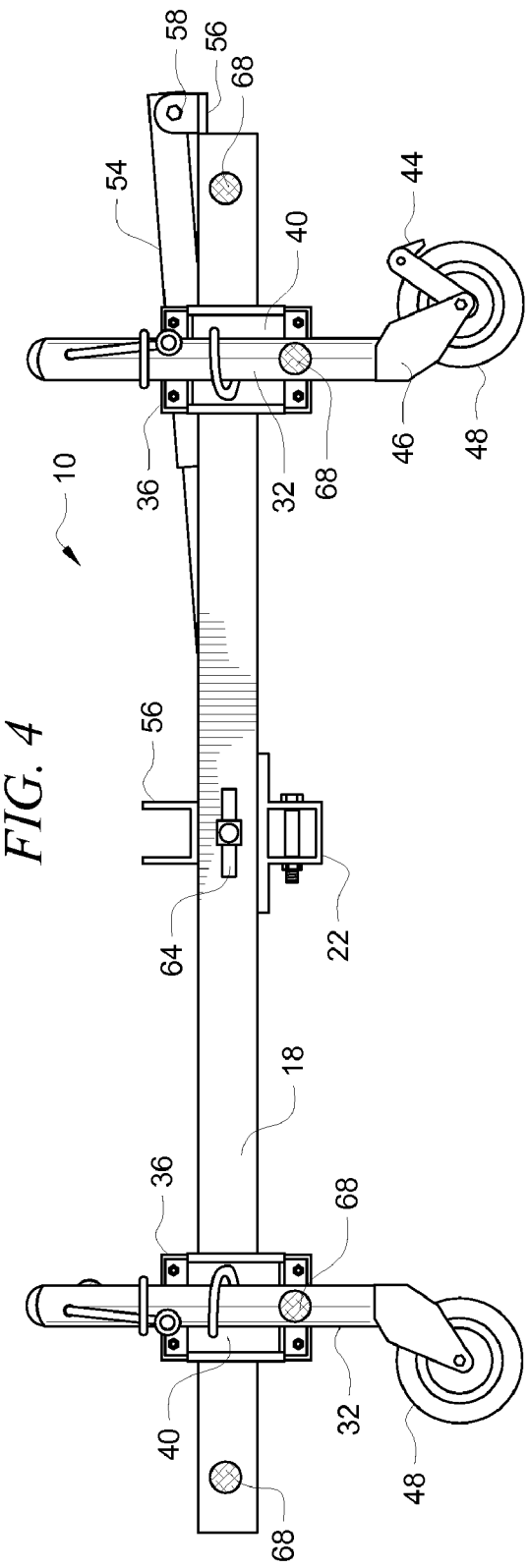
FIG. 4 is a front view of the view of the present invention with swivel jacks lowered.

Adjustable swivel jacks 32 are pivotally mounted at predetermined positions on the front bracket 18 and the rear bracket 20 of the frame 12. A pair of swivel jacks 32 is preferably mounted on the front bracket 18 and the rear bracket 20, respectively. The swivel jacks 32 can be located in a locked and unlocked position. When the jacks 32 are pivoted to an upper position, the jacks 32 are parallel to the frame 12, and the dolly 10 is in the position for transport by the vehicle 26. In the lowered and locked position, as illustrated in FIG. 4, wheels 48 of the jacks 32 enables the dolly 10, when unattached to the vehicle, to function akin to a wagon and to be moved to a desired location. The jacks 32 have jack handles 42 which raise and lower the jacks 32 as needed to raise and lower the elevation of the dolly 10. Bungee bands 62 may be optionally provided to secure the jack handles 42 during transport. Illumination means 68 are fastened at locations on the frame 12, and provide awareness of the dolly 10 when the vehicle 26 is transporting the dolly 10 during night or limited light periods. The illumination means 68 can be standard lights or reflectors. A wireless camera 64 mounted on the front bracket 18 of the frame 12 is also optionally provided to allow viewing from the cab of the vehicle 26.

Figure 5:
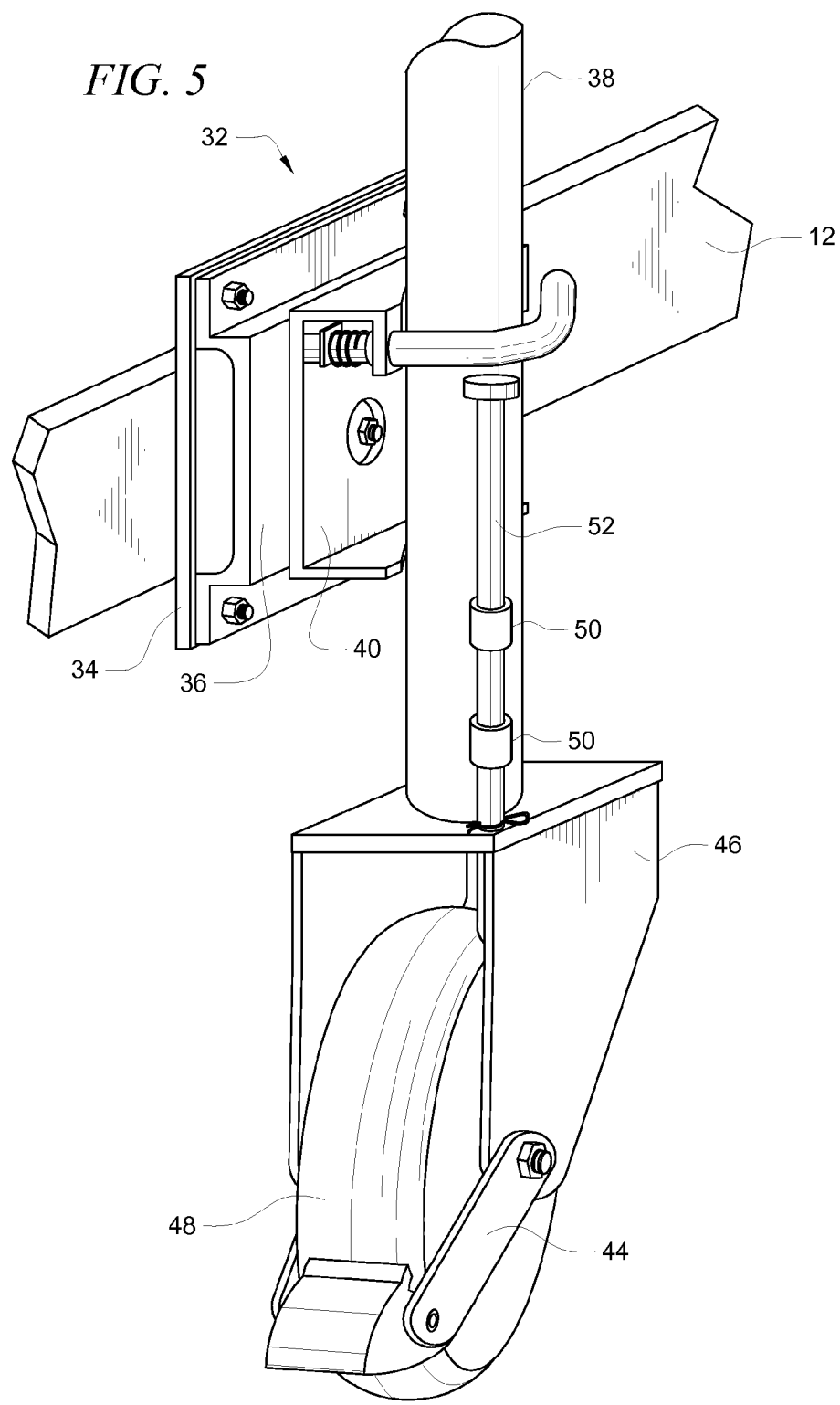
FIG. 5 is a fragmentary view of swivel jack mounted on the frame of the present invention.

FIG. 5 illustrates one jack 32 mounted on the frame 12. An inner plate 34 is welded or bolted on the frame 12 at a predetermined location. An outer plate 36 is mounted to the inner plate 34 using a series of nuts and bolts, although other mounting means such as welding are possible. The jacks 32 are comprised of a cylindrical tube 38 having a first and a second end with a mounting bracket 40 integrally attached outside the tube 38. The mounting bracket 40 is positioned to mate with the outer plate 36. At the first end of the tube 38 is attached a wheel plate 46 having an upper wall and side walls, and further having a hole through the upper wall. The wheel plate 46 is coupled with a wheel 48. The wheel plate 46 translates around the axis of the tube 38, permitting rotation of the wheel 48. A braking assembly 44 pivotally connected to at least one wheel plate 46 is optionally provided. The braking assembly 44 prevents movement of the dolly 10 if desired when the jacks 32 are locked in the lower position.

Alternatively, channels 50 having a bore therethrough are mounted to the side of the tube 38 of the swivel jack 32. A removable drop pin 52 is provided to extend through the channels 50 and pass through the hole in the upper surface of the wheel plate 46. The drop pin 52 is secured by a cotter pin. Once engaged with the drop pin 52 the wheel 48 is stabilized and locked to prevent the wheel 48 from drifting while the dolly 10 is being pulled. In the preferred embodiment having opposed pairs of swivel jacks 32 mounted on the dolly 10, the two rearward wheels 48 would be engaged with the drop pin 52 to prevent drifting, while the two forward wheels 48 would have turning capability.

A telescoping handle 54 having a first end and a second end provides means to pull the dolly 10 when the jacks 32 are in the lowered position. At least one handle bracket 56 is bolted or welded at a predetermined location on the perimeter of the frame 12. The handle bracket 56 is preferably mounted on the side bracket 16 of the frame 12, although as illustrated in FIG. 3, the handle bracket 56 can be mounted on the front bracket 18 of the frame 12. The first end of the handle 54 is demountably coupled with the handle bracket 56 by handle fastening means 58, and in the preferred embodiment a pulling bar 60 is integrally formed at the second end. The handle 54 is used to pull the dolly 10 when the swivel jacks 32 are lowered into a locked position. By disconnecting the fastening means 58 the handle 54 can be removed for storage.

Figure 6:
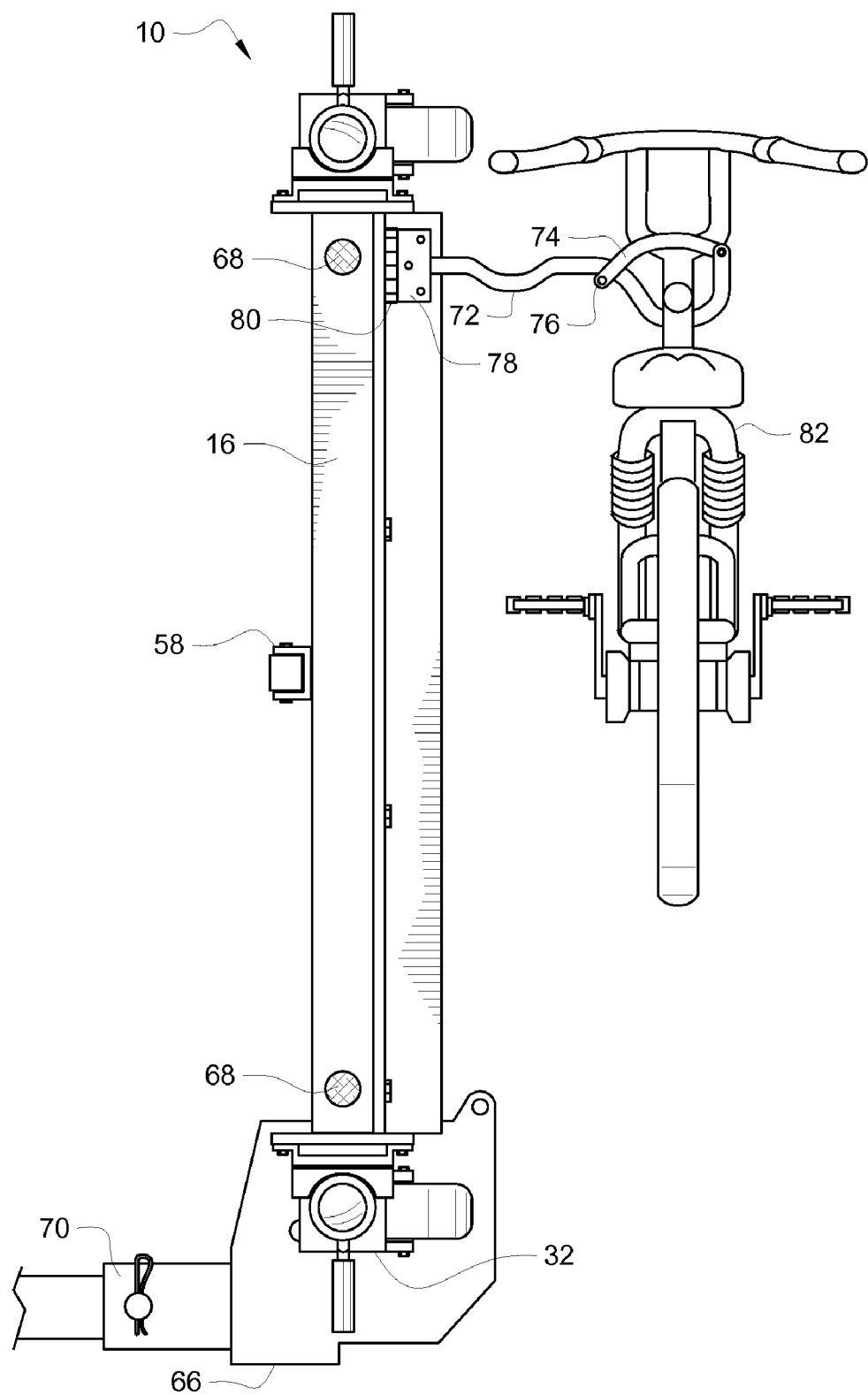
FIG. 6 is a side view of the present invention in a raised position with a bicycle mounted on bicycle carrying means.
Figure 7:
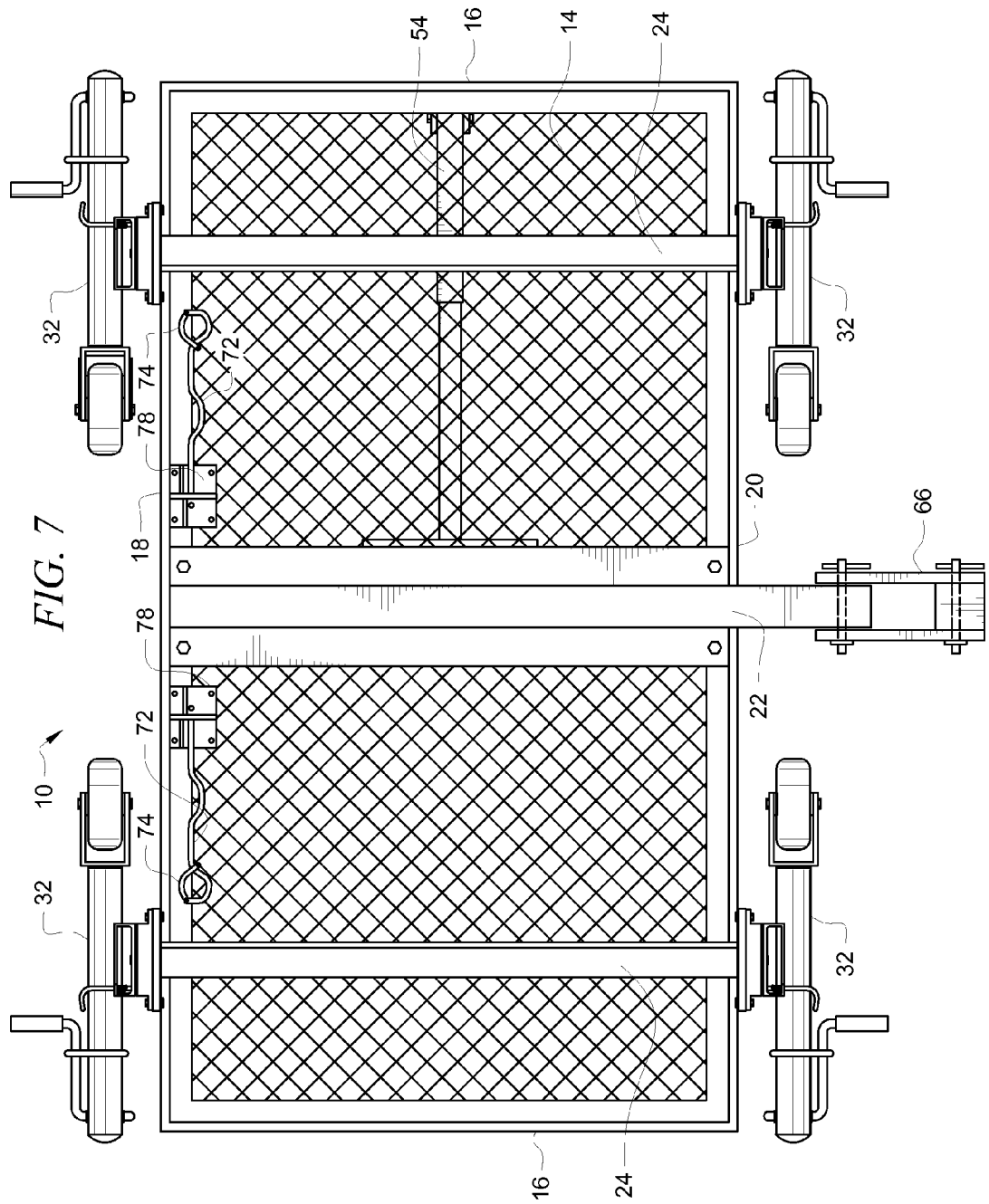
FIG. 7 is front view of the present invention in a raised position with bicycle carrying means attached to the base.

Referring to FIGS. 6 and 7 illustrates an embodiment of the carrier 10 configured to transport a bicycle 82. The center support 22 is mated with a folding basket adapter 66 having a hitch extension 70 adapted to slide into the trailer hitch receiver 28 of the vehicle 26. Since the folding basket adapter 66 is well known by those skilled in the art, further detailed discussion of the same is not deemed necessary. The folding basket adapter 66 allows the frame 12 to be rotated perpendicular to the hitch receiver 28 from a horizontal to a vertical position. Bicycle carrying means 72 are welded or bolted to the bottom surface of the base 14 of the frame 12. The bicycle carrying means 72 has a first end integrally formed as a U-shaped end and a second end mounted perpendicularly to a hinged member. The hinged member is comprised of a pair of plates 78, each with a set of open cylindrical rings attached to the plates 78. The rings are offset from each other and mesh together. A hinge pin 80 is mounted through the rings and combines the plates 78. Each plate 78 has a partition with an aperture therethrough formed perpendicular to the inner surface of each plate 78. When the plates 78 are rotated the partitions are positioned parallel to each other. A flap 74 is pivotally connected to the U-shaped end of the carrying means 72 at one end and has an aperture 76 the distal end. A padlock can be inserted into the aperture 76 to secure the bicycle 78.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description only and should not be regarded as limiting the scope and intent of the invention.

I claim:

1. A vehicle hitch attachable transporting dolly for use in conjunction with a conventional trailer hitch receiver, comprising in combination:
   a frame having a base with a top surface and a bottom surface, the base mounted on opposed side brackets, a front bracket and a rear bracket;
   a center support member mounted on and traversing the bottom surface of the base having a first end and a second end, the second end integrally formed as a hitch connector that operatively engages the hitch receiver;
   one or more bottom support members mounted on and traversing the bottom surface of the base;
   a first pair of swivel jacks fixed to the front bracket of the frame, each jack having a cylindrical tube having a first end and a second end, the jacks each further comprising a handle for height adjustment of the frame, and a wheel plate having a top wall and side walls, the plate being connected at the first end of the tube, the plate being coupled with a wheel, and each jack being pivotable to an upper position parallel to the frame;
   a second pair of swivel jacks fixed to the rear bracket of the frame, each jack having a cylindrical tube having a first end and a second end, the jacks each further comprising a handle for height adjustment of the frame, and a wheel plate having a top wall and side walls, the plate being connected at the first end of the tube, the plate being coupled with a wheel, and each jack being pivotable to an upper position parallel to the frame;
   a first handle bracket mounted on the front bracket of the frame and a second handle bracket mounted on one side bracket of the frame; and
   a telescoping handle having a first end and a second end, the first end being demountably coupled with the handle bracket by handle fastening means and the second end of the telescoping handle defining a pulling bar.

2. The dolly of claim 1, further comprising a braking assembly pivotally connected to at least one wheel plate.

3. The dolly of claim 1, further comprising one or more illumination means mounted on the frame.

4. The dolly of claim 1, further comprising channels having a bore therethrough mounted on the side of the tube of at least one jack, the top wall of the wheel plate further having an aperture, and a drop pin positioned to extend through the channels and the aperture of the top wall to stabilize movement of the wheel plate and the wheel.

5. A vehicle hitch attachable transporting dolly for use in conjunction with a conventional trailer hitch receiver, comprising in combination:
   a frame having a base with a top surface and a bottom surface, the base mounted on opposed side brackets, a front bracket and a rear bracket;
   a center support member mounted on and traversing the bottom surface of the base having a first end and a second end, the second end mated with a folding basket adapter having a hitch extension that operatively engages the hitch receiver;
   one or more bottom support members mounted on and traversing the bottom surface of the base;
   a first pair of swivel jacks fixed to the front bracket of the frame, each jack having a cylindrical tube having a first end and a second end, the jacks each further comprising a handle for height adjustment of the frame, and a wheel plate having a top wall and side walls, the plate being connected at the first end of the tube, the plate being coupled with a wheel, and each jack being pivotable to an upper position parallel to the frame;

a second pair of swivel jacks fixed to the rear bracket of the frame, each jack having a cylindrical tube having a first end and a second end, the jacks each further comprising a handle for height adjustment of the frame, and a wheel plate having a top wall and side walls, the plate being connected at the first end of the tube, the plate being coupled with a wheel, and each jack being pivotable to an upper position parallel to the frame;

a first handle bracket mounted on the front bracket of the frame and a second handle bracket mounted on one side bracket of the frame;

a telescoping handle having a first end and a second end, the first end being demountably coupled with the handle bracket by handle fastening means and the second end of the telescoping handle defining a pulling bar;

a folding basket adapter having a hitch extension adapted to engage with the trailer hitch receiver; and bicycle carrying means having a first end formed as a U-shaped end and second end connected to a hinge member, the hinge member being pivotally mounted on the bottom surface of the base of the frame, the means used for securing a bicycle when the frame is raised from a horizontal to vertical position.

\* \* \* \* \*